(12) United States Patent
Bullock et al.

(10) Patent No.: US 12,400,488 B2
(45) Date of Patent: Aug. 26, 2025

(54) PLANNED MAINTENANCE SCHEDULE SYNCHRONIZATION WITH ONBOARD DISPLAY DEVICE

(71) Applicant: Caterpillar Inc., Peoria, IL (US)

(72) Inventors: Robert Gerald Bullock, Chillicothe, IL (US); Nasreen Banu Abdul Wahab, Chennai (IN); Ganesh Vairaperumal, Chennai (IN); Chandrakanth Dumpala, Srikakulam (IN); Manish Kumar, Normal, IL (US); Anish Jeba Justus Gilbert, Secunderabad (IN); Sooraj Veer Ramesh Veeran, Coimbatore (IN)

(73) Assignee: Caterpillar Inc., Peoria, IL (US)

( * ) Notice: Subject to any disclaimer, the term of this patent is extended or adjusted under 35 U.S.C. 154(b) by 559 days.

(21) Appl. No.: 17/859,966

(22) Filed: Jul. 7, 2022

(65) Prior Publication Data
US 2024/0013581 A1    Jan. 11, 2024

(51) Int. Cl.
*G07C 5/00* (2006.01)
*B60W 50/12* (2012.01)
*B60W 50/14* (2020.01)

(52) U.S. Cl.
CPC .............. *G07C 5/006* (2013.01); *B60W 50/12* (2013.01); *B60W 2050/146* (2013.01)

(58) Field of Classification Search
CPC . G07C 5/006; B60W 50/12; B60W 2050/146; G06Q 10/20
See application file for complete search history.

(56) References Cited

U.S. PATENT DOCUMENTS

| | | | | |
|---|---|---|---|---|
| 8,190,322 B2 * | 5/2012 | Lin | ........................ | G07C 5/008 |
| | | | | 701/31.4 |
| 8,958,943 B2 * | 2/2015 | Bertosa | ................ | G07C 5/0808 |
| | | | | 701/469 |
| 9,791,861 B2 * | 10/2017 | Keohane | ................ | G01C 21/34 |
| 10,049,505 B1 | 8/2018 | Harvey et al. | | |
| 2008/0059080 A1 * | 3/2008 | Greiner | ................... | H04L 43/16 |
| | | | | 702/182 |

(Continued)

FOREIGN PATENT DOCUMENTS

| | | |
|---|---|---|
| CN | 109615094 A | 4/2019 |
| CN | 112737829 A | 4/2021 |
| WO | WO2021031983 | 2/2021 |

OTHER PUBLICATIONS

Written Opinion and International Search Report for Int'l. Patent Appln. No.PCT/US2023/068847, mailed Sep. 11, 2023 (17 pgs).

*Primary Examiner* — Mussa A Shaawat

(57) ABSTRACT

A planned maintenance system communicates with a set of user platforms that includes an onboard display device of a machine. The planned maintenance system changes a maintenance schedule for the machine based on input data received from any of the user platforms, or usage data associated with the machine. The planned maintenance system provides output data reflecting changes to the maintenance schedule to the user platforms, including the onboard display device. Accordingly, the set of user platforms, including the onboard display device of the machine, can be synchronized with consistent information about the maintenance schedule for the machine.

20 Claims, 6 Drawing Sheets

(56) References Cited

U.S. PATENT DOCUMENTS

| | | | |
|---|---|---|---|
| 2008/0082345 A1* | 4/2008 | Greiner | G06Q 10/20 |
| | | | 705/305 |
| 2013/0325541 A1* | 12/2013 | Capriotti | G06Q 10/087 |
| | | | 705/7.21 |
| 2014/0350989 A1* | 11/2014 | Telatar | G06Q 10/1097 |
| | | | 705/7.21 |
| 2016/0071334 A1 | 3/2016 | Johnson et al. | |
| 2016/0376771 A1* | 12/2016 | Behmlander | E02F 9/26 |
| | | | 37/453 |
| 2017/0017934 A1 | 1/2017 | Bou-Ghannam et al. | |
| 2017/0091718 A1* | 3/2017 | Bullock | G07C 5/008 |
| 2017/0193460 A1* | 7/2017 | Subramaniyan | G06Q 10/20 |
| 2019/0005464 A1* | 1/2019 | Harris, III | G06Q 10/20 |
| 2019/0251759 A1 | 8/2019 | Lora et al. | |
| 2021/0042708 A1 | 2/2021 | Gardiner et al. | |
| 2021/0241138 A1 | 8/2021 | Meroux et al. | |
| 2022/0114560 A1 | 4/2022 | Senzer et al. | |

* cited by examiner

PLANNED MAINTENANCE SCHEDULE SYNCHRONIZATION WITH ONBOARD DISPLAY DEVICE

TECHNICAL FIELD

The present disclosure relates to planned maintenance schedules for machines, and more particularly, to synchronizing information about a planned maintenance schedule between an onboard display device of a machine and other user platforms.

BACKGROUND

Maintenance services can be performed on machines, such as vehicles, heavy machinery, industrial equipment, or other types of machines. Such maintenance services can be preventative maintenance services or other maintenance services that are planned in advance according to a maintenance schedule. For example, maintenance services such as oil changes, battery replacements, tire rotations, and/or other maintenance services can be scheduled in advance for a particular machine, so that instances of particular types of services can be performed on the machine at regular or irregular intervals defined by a maintenance schedule.

Some systems have been developed that may use data received from a machine to suggest when particular maintenance services should be performed on the machine. For example, U.S. Patent App. Pub. No. 2019/0251759 to Lora et al. (hereinafter "Lora") describes a system in which a vehicle can use a telematic device to transmit vehicle health information to a server. Lora's server can use the vehicle health information to predict when a type of maintenance service should be performed on the vehicle. Lora's server can also provide a user interface dashboard to users at a car dealership, so that the users at the car dealership can view suggested maintenance services and other vehicle information. Lora's server can also send an automated notification of a suggested maintenance service to a vehicle owner via an email, a text message, or a mobile application.

However, although Lora's server may notify a vehicle owner about a suggested maintenance service via an email, a text message, or a mobile application, Lora's server does not cause a corresponding maintenance service notification to be displayed via a screen or other display in the vehicle itself. The vehicle may have a separate internal system that displays check engine lights or other indicators of certain conditions detected independently by the internal system, but that internal system is not synchronized with the rest of Lora's system. For example, if a technician were to perform a maintenance service in response to a check engine light, the technician may need to clear the check engine light at the vehicle and also separately interact with Lora's server via the user interface dashboard to mark the maintenance service as having been completed in a database.

Additionally, the system described by Lora relates to prediction of otherwise unplanned maintenance services, and may not relate to schedules of planned maintenance services. For example, Lora's server may use vehicle health information received from a vehicle to predict when a particular type of maintenance should be performed on the vehicle. However, many types of maintenance services can be pre-planned maintenance services that are scheduled to be performed at regular or irregular intervals. The system described in Lora does not adjust schedules of pre-planned maintenance services based on data received from vehicles, and does not synchronize schedules of pre-planned maintenance services between onboard display devices of the vehicles and other devices and/or applications.

The system described in Lora, and other conventional systems that do not synchronize schedules of planned maintenance services between onboard display devices and other devices and/or applications, can lead to user confusion and/or reduce efficiencies and productivity. For example, some conventional systems may initially load a default planned maintenance schedule for a machine to both an onboard display device of the machine and to a separate online maintenance tracking system that is not linked to the onboard display device, for instance when the machine is first produced at a factory. Because the onboard display device and the online maintenance tracking are not linked in this example, the onboard display device and the online maintenance tracking system may independently manage and update different instances of the maintenance schedule. Accordingly, if any changes are made to one instance of the maintenance schedule, those changes would not be propagated to the other instance of the maintenance schedule, and the instances of the maintenance schedule managed independently by the onboard display device and the online maintenance tracking system can reflect different scheduling information that may cause confusion and/or negatively impact productivity and efficiencies.

As an example, if a user were to use the online maintenance tracking system to reschedule an instance of a maintenance service from the current date to a later date, the rescheduling of the instance of the maintenance service would not be reflected in the separate version of the maintenance schedule maintained at the onboard display device. Accordingly, the onboard display device may still indicate that the instance of a maintenance service is scheduled for the current date. An operator of the machine who views the onboard display device and sees the indication that the maintenance service is scheduled for the current date may attempt to bring the machine to a maintenance technician at a maintenance facility for the maintenance service to be performed, even though another user rescheduled the instance of a maintenance service to a later date. This can lead to confusion between the operator of the machine and the maintenance technician, impact productivity on a worksite if the operator drove to the maintenance facility instead of performing work at the worksite, and also impact productivity at the maintenance facility if the machine is brought to the maintenance facility but the maintenance service has been rescheduled for a future date.

As another example, if a maintenance technician or other user marks an instance of a maintenance service as complete in the online maintenance tracking system, the separate onboard display device may still separately indicate that the maintenance service is not yet complete and is still scheduled to be performed. Accordingly, the user or a different user may spend additional time and effort to separately interact with the onboard display device to clear a separate maintenance service notification about the now-complete maintenance service, even though the maintenance service was already marked complete in the independent online maintenance tracking system. This can be frustrating for users, and take additional time and effort. Additionally, when users have to use both the onboard display device and the separate online maintenance tracking system in this example, overall usage of energy and computing resources associated with both the onboard display device and the separate online maintenance tracking system can be increased.

The example systems and methods described herein are directed toward overcoming one or more of the deficiencies described above.

SUMMARY

According to a first aspect, a computing system includes one or more processors, one or more communication interfaces, and memory. The memory stores a maintenance schedule associated with a machine. The memory also stores computer-executable instructions associated with a planned maintenance system that, when executed by the one or more processors, cause the one or more processors to perform operations. The operations include making one or more changes to the maintenance schedule based on at least one of usage data associated with the machine, or input data associated with the maintenance schedule. The operations also include providing output data, via the one or more communication interfaces, and indicating the one or more changes to the maintenance schedule, to a set of user platforms. The set of user platforms includes an onboard display device of the machine and an additional user platform. The output data causes the set of user platforms to synchronize information, associated with the maintenance schedule, maintained by the set of user platforms.

According to a second aspect, a computer-implemented method includes maintaining, by one or more processors, a maintenance schedule associated with a machine. The computer-implemented method also includes receiving, by the one or more processors, at least one of usage data associated with the machine, or input data associated with the maintenance schedule. The computer-implemented method further includes making, by the one or more processors, one or more changes to the maintenance schedule based on the at least one of the usage data or the input data. The computer-implemented method additionally includes providing, by the one or more processors, output data to a set of user platforms that comprises an onboard display device of the machine and an additional user platform. The output data indicates the one or more changes to the maintenance schedule. The output data also causes the set of user platforms to synchronize information, associated with the maintenance schedule, maintained by the set of user platforms.

According to a third aspect, a system includes an onboard display device of a machine, a user platform accessible via a user device, and a planned maintenance system. The planned maintenance system is configured to maintain a maintenance schedule associated with the machine. The planned maintenance system is also configured to receive at least one of usage data associated with the machine, or input data associated with the maintenance schedule. The planned maintenance system is further configured to make one or more changes to the maintenance schedule based on the at least one of the usage data or the input data. The planned maintenance system is additionally configured to provide output data to the onboard display device and the user platform. The output data indicates the one or more changes to the maintenance schedule. The output data also causes the onboard display device and the user platform to synchronize information, associated with the maintenance schedule, maintained by the onboard display device and the user platform.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
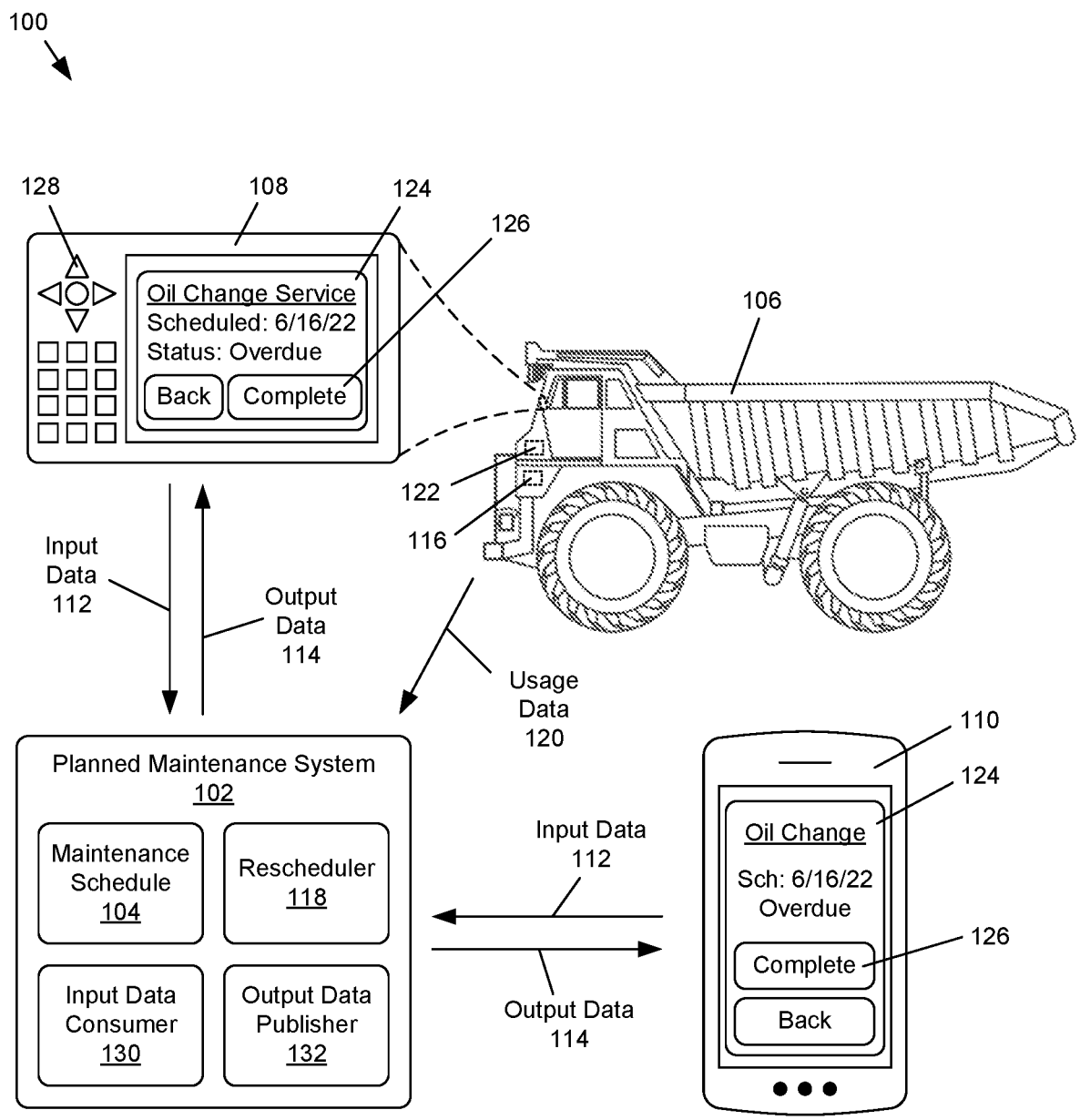
FIG. 1 shows an example in which a planned maintenance system synchronizes information associated with a maintenance schedule for a machine among multiple user platforms, including an onboard display device of the machine.

FIG. 1 shows an example 100 in which a planned maintenance system 102 synchronizes information associated with a maintenance schedule 104 for a machine 106 among multiple user platforms, including an onboard display device 108 of the machine 106. The onboard display device 108 can be a dashboard display or other device with a screen mounted or present within a cab of the machine 106, or otherwise located onboard the machine 106. The onboard display device 108 can be configured to exchange data with the planned maintenance system 102 via a wireless data connection, as described further below. The onboard display device 108 can also have a user interface configured to present information associated with the maintenance schedule 104, such as notifications of maintenance services that are scheduled and/or may be overdue or upcoming for the machine 106.

In addition to the onboard display device 108, the user platforms can also include user devices, and/or websites, applications, or other elements associated with the planned maintenance system 102 that users can access via user devices. User devices can be smartphones, personal digital assistants (PDAs), tablet computers, personal computers (PCs), such as laptops, desktops, or workstations, or any other type of computing or communication device. Such user platforms can communicate with the planned maintenance system 102, for instance via wireless or wired data connections, and allow users to view and/or access information associated with the maintenance schedule 104.

As an example, the user platforms can include the user device 110 shown in FIG. 1. The user device 110 can be a smartphone, computer, or other type of user device configured to execute a local application associated with the planned maintenance system 102, load a website associated with the planned maintenance system 102, or otherwise access the planned maintenance system 102. Accordingly, the user device 110 can communicate with the planned maintenance system 102 and display information associated with the maintenance schedule 104 for the machine 106, such as notifications of maintenance services that are scheduled and/or may be overdue or upcoming for the machine 106.

As described further below, the planned maintenance system 102 can centrally manage the maintenance schedule 104 associated with the machine 106, such that information about the maintenance schedule 104 that can be accessed and/or displayed via the onboard display device 108, the user device 110, and/or other user platforms can be synchronized and consistent. The planned maintenance system 102 can be in bidirectional communication with the user platforms, such that changes to the maintenance schedule 104 that are made based on data provided to the planned maintenance system 102 by one user platform can be propagated by the planned maintenance system 102 to all of the user platforms.

For example, the planned maintenance system 102 can receive input data 112 from any of the user platforms that causes the planned maintenance system 102 to update the maintenance schedule 104. When the planned maintenance system 102 updates the maintenance schedule 104 in response to input data 112 from one of the user platforms, the planned maintenance system 102 can provide corresponding output data 114 to all of the user platforms, including the onboard display device 108. Accordingly, an update to the maintenance schedule 104 that is initiated on one of the user platforms can be propagated to all of the other user platforms via the planned maintenance system 102, such that the onboard display device 108, the user device 110, and/or other user platforms can have and present consistent information about the updated maintenance schedule 104.

The machine 106 can be a vehicle, a piece of heavy machinery, a piece of industrial equipment, or any other type of machine. For example, the machine 106 can be a commercial or work machine, such as a mining vehicle, earthmoving vehicle, backhoe, excavator, scraper, dozer, crusher, loader (e.g., large wheel loader, track-type loader, etc.), shovel, truck (e.g., mining truck, haul truck, on-highway truck, off-highway truck, articulated truck, tanker, etc.), a crane, a pipe layer, a paver, a compactor, a tractor, farming equipment, or any other type of mobile machine, stationary machine, or portable machine.

The machine 106 may operate at, and/or travel around, a worksite, such as a mine site, a quarry, a construction site, or any other type of worksite or work environment. As an example, the machine 106 can be a haul truck that moves dirt, rocks, gravel, and/or other material around a worksite. In some examples, the machine 106 can have one or more work tools, such as a bucket, scraper, ripper, blade, pusher, fork, grapple, plow, haul bed, or other type of work tool. In these examples, the machine 106 can be configured to move and/or use one or more types of work tools to interact with rocks, gravel, dirt, sand, lumber, construction material, and/or any other type of material on a worksite. In other examples, the machine 106 can be a vehicle or other mobile machine used for personal transportation, commercial transportation, or other purposes, such as an on-highway truck or other vehicle configured to travel on public and/or private roads.

The machine 106 and/or the onboard display device 108 of the machine 106 can have, or be linked to, wireless communication interfaces 116. The wireless communication interfaces 116 can include cellular interfaces, WiFi® interfaces, Bluetooth® interfaces, satellite data interfaces, and/or other types of wireless communication interfaces. The wireless communication interfaces 116 can include modems, receivers, transmitters, antennas, and/or other hardware or software elements configured to send and receive data. The onboard display device 108 can accordingly use the wireless communication interfaces 116 to send data to, and receive data from, the planned maintenance system 102, as discussed further below.

Figure 6:
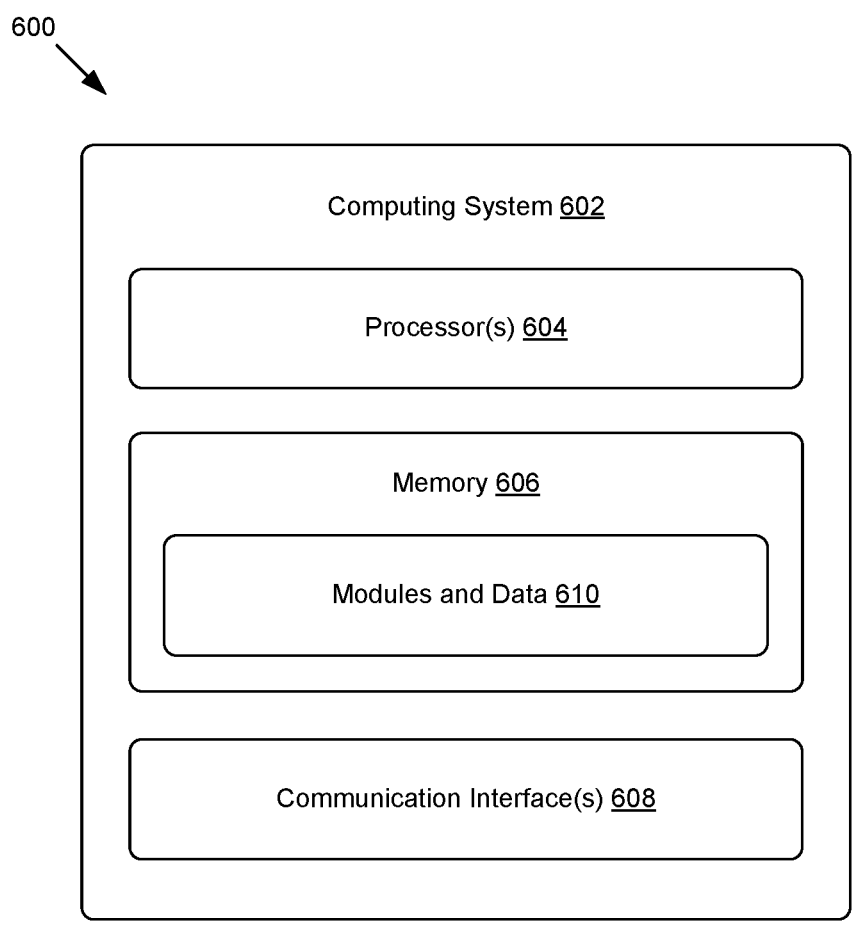
FIG. 6 shows an example system architecture for a computing system.

The planned maintenance system 102, the user device 110, and/or other user platforms can have similar wireless communication interfaces and/or wired communication interfaces, such that the planned maintenance system 102 can also send data to, and receive data from, the user platforms as described herein. For example, the planned maintenance system 102 can be, or can be executed by, one or more servers, computers, or other off-board computing devices that are remote from the machine 106, and that can exchange data with the onboard display device 108, the user device 110, and other user platforms via wireless communication interfaces and/or wired communication interfaces. FIG. 6, discussed further below, shows an example system architecture for a computing system associated with the planned maintenance system 102.

As described above, the planned maintenance system 102 can maintain and update the maintenance schedule 104 associated with the machine 106. For example, the planned maintenance system 102 can store data associated with the maintenance schedule 104 in memory, such as within a database or other data repository. The planned maintenance system 102 can also maintain and update data associated with maintenance schedules for multiple machines, such as a fleet of different machines.

The maintenance schedule 104 associated with the machine 106 can indicate one or more maintenance services to be performed on the machine 106. In some examples, the maintenance schedule 104 can indicate scheduled dates for planned maintenance services, such as specific dates at which instances of maintenance services are currently scheduled to be performed. The maintenance schedule 104 can also, or alternately, indicate classification statuses of instances of planned maintenance services. As an example, the maintenance schedule 104 can indicate that a first maintenance service for the machine 106 is upcoming, but indicate that a second maintenance service for the machine 106 is overdue. In some examples, the maintenance schedule 104 can indicate both a scheduled date and a classification status for an instance of a maintenance service. For instance, the maintenance schedule 104 can indicate that particular maintenance service is currently scheduled to be performed on the machine 106 on a certain date, and also indicate whether that particular maintenance service is currently upcoming or overdue based on target intervals and other factors as discussed further below.

The maintenance schedule 104 can, for example, indicate target intervals between instances of types of maintenance services that can be used to determine dates for performance of instances of the maintenance services. The maintenance schedule 104 can indicate whether maintenance services are overdue or upcoming, and/or schedule dates for performance of the maintenance services, based on such target intervals and/or dates.

As a non-limiting example, the maintenance schedule 104 may indicate that oil change services should be performed on the machine 106 every three months. The maintenance schedule 104 can accordingly indicate dates for performance of upcoming oil change services that are separated by three-month intervals, or indicate a date for performance of the next oil change service that is three months after a date when the last oil change service was performed on the machine 106. The dates scheduled based on such target intervals may or may not be subsequently changed as described further below. In some examples, the maintenance schedule 104 can classify the next instance of the oil change service as "upcoming" if the current date is less than three months after the last oil change service was performed on the machine 106, and classify the next instance of the oil service as "overdue" if the next instance of the maintenance service has not yet been performed three months after the last oil change service was performed on the machine 106.

As another non-limiting example, the maintenance schedule 104 may indicate that a particular type of maintenance service should be performed on the machine 106 every 1000 hours that the machine 106 is in operation, and indicate a date for performance of the next instance of the particular type of maintenance service based on a prediction of when the machine 106 will reach 1000 hours since the last instance of the particular type of maintenance service was performed. A date scheduled based on such a prediction may or may not be subsequently changed based on user input and/up updated predictions, as described further below. In some examples, the maintenance schedule 104 can classify the next instance of the maintenance service as "upcoming" until the machine 106 reaches 1000 operating hours since the last instance of the maintenance service was performed, and classify the next instance of the maintenance service as "overdue" if the next instance of the maintenance service has not yet been performed by the time the machine 106 reaches 1000 operating hours after performance of the last instance of the maintenance service.

As discussed above, any of the user platforms may provide input data 112, associated with the maintenance schedule 104 for the machine 106, to the planned maintenance system 102. The user platforms can transmit the input data 112 to the planned maintenance system 102 via wireless and/or wired communication interfaces, as described above. In some examples, the input data 112 can indicate that a particular instance of a maintenance service has been completed on the machine 106, or indicate that one or more subtasks associated with an instance of a maintenance service has been completed. In other examples, input data 112 can revoke a previous indication that a particular instance of a maintenance service has been completed on the machine 106, add or adjust target intervals between instances of a type of maintenance service, schedule or reschedule an instance of a maintenance service, or be another type of input associated with the maintenance schedule 104. The input data 112 can include or be marked with an identifier of the machine 106, such as a serial number, a name, or other code or unique identifier of the machine 106. The planned maintenance system 102 can accordingly identify the maintenance schedule 104 associated with the machine 106 based on the identifier of the machine 106, and update the maintenance schedule 104 in response to input data 112 received from any of the user platforms.

As an example, the onboard display device 108 or the user device 110 may provide input data 112 indicating that a scheduled maintenance service has been performed on the machine 106, for instance if a maintenance technician has used the onboard display device 108 or the user device 110 to mark the scheduled maintenance service as complete. Based on the input data 112, the planned maintenance system 102 can clear the instance of the maintenance service from the maintenance schedule 104, or otherwise update the maintenance schedule 104 to mark the instance of the maintenance service as complete.

As another example, the planned maintenance system 102 can have a rescheduler 118 that adjusts the maintenance schedule 104 to reschedule upcoming maintenance services for the machine 106 based on target intervals and/or input data 112 received from any of the user platforms. For instance, if input data 112 indicates that a type of maintenance service was performed on the machine 106 on a particular date, and a target interval indicates that the type of maintenance service is to be performed every 120 days, the rescheduler 118 can adjust the maintenance schedule 104 to indicate that the next instance of that type of maintenance service for the machine 106 is to be performed 120 days from the particular date. Accordingly, if an instance of the maintenance service was performed late, after a scheduled date for the instance of the maintenance service previously indicated by the maintenance schedule 104, the rescheduler 118 can schedule or reschedule the next instance of the maintenance service in the maintenance schedule 104 based on a target interval and input data 112 indicating when the instance of the maintenance service was actually performed.

In some examples, the rescheduler 118 can also be configured to adjust the maintenance schedule 104 based on usage data 120 received from the machine 106. The usage data 120 can indicate how long the machine 106, and/or individual components of the machine 106, were in operation during a period of time. In some examples, the usage data 120 can include, or be derived from, sensor data captured by one or more sensors 122 of the machine. The sensors 122 can include Global Positioning System (GPS) sensors, other location and/or positioning sensors, payload monitors, operation time monitors, speed sensors, temperature sensors, tire pressure sensors, battery state of health (SoH) sensors, fuel sensors, cameras, LIDAR sensors, RADAR sensors, other optical sensors or perception systems, and/or other types of sensors. In some examples, the onboard display device 108, or an electronic control module (ECM) or other onboard computing device of the machine 106, can be configured to determine usage data 120 based on the sensor data, and transmit the usage data 120 to the planned maintenance system 102 via the wireless communication interfaces 116. In other example, the onboard display device 108, or an ECM or other onboard computing device, can transmit one or more types of sensor data to the planned maintenance system 102, such that the planned maintenance system 102 can derive the usage data 120 from the provided sensor data. The rescheduler 118 can be configured to use the usage data 120 associated with the machine 106 to schedule or reschedule maintenance services in the maintenance schedule 104 associated with the machine 106.

As a non-limiting example, the usage data 120 may indicate a number of hours the machine 106 was in operation during a day, or another period of time. Accordingly, if a particular type of maintenance service is to be performed on the machine 106 every 1000 operating hours, the rescheduler 118 may use the usage data 120 to project a date when the machine 106 will reach a total of 1000 operating hours since the last instance of the particular type of maintenance service was performed, and adjust the scheduled date for the next instance of the particular type of maintenance service to the projected date in the maintenance schedule 104. In some examples, the rescheduler 118 may use usage data 120 received over time to determine historical usage patterns of the machine 106, and use the historical usage patterns to project when the next instance of the particular type of maintenance service should be scheduled. For example, usage data 120 may indicate how many hours a day the machine 106 is in use on average, average hours that the machine 106 is in use during different days of the week, or other historical usage patterns. Accordingly, if new and/or historical usage data 120 indicates that the machine 106 has been in heavy use, the rescheduler 118 may adjust the maintenance schedule 104 so that the next instance of the particular type of maintenance service is rescheduled to a date that is sooner than a previously scheduled date. However, if new and/or historical usage data 120 indicates that the machine 106 has not been in heavy use, the rescheduler 118 may adjust the maintenance schedule 104 to delay the next instance of the particular type of maintenance service.

In some examples, the onboard display device 108 may also have access to the usage data 120 associated with the machine 106. Accordingly, the onboard display device 108 can locally determine differences between current data indicated by the usage data 120, and scheduled dates, target intervals, or other information about the maintenance schedule 104 received from the planned maintenance system 102. As an example, information about the maintenance schedule 104 received from the planned maintenance system 102 may indicate a target operating hour interval between instances of a type of maintenance service. The onboard display device 108 can accordingly use usage data 120 to locally determine how many operating hours have elapsed since the last instance of that type of maintenance service, and locally determine how many more operating hours remain until the target operating hour interval associated with the type of maintenance service.

When the planned maintenance system 102 updates the maintenance schedule 104, for instance to mark maintenance services as complete and/or to reschedule maintenance services as described above, the planned maintenance system 102 can provide output data 114 associated with the updated maintenance schedule 104 to all of the user platforms. In some examples, the planned maintenance system 102 can also provide output data 114 associated with the maintenance schedule 104 to one or more user platforms during initial setup or onboarding of the user platforms, during factory refresh operations to reset the user platforms to a default state, and/or at any other time. The output data 114 can indicate one or more scheduled maintenance services that may be overdue and/or upcoming for the machine 106, based on the most recent version of the maintenance schedule 104 stored at the planned maintenance system 102. Accordingly, the output data 114 provided by the planned maintenance system 102 can cause all of the user platforms to be synchronized based on the most recent data associated with the maintenance schedule 104 for the machine 106.

The planned maintenance system 102 can transmit the output data 114 to the user platforms via wireless and/or wired communication interfaces, as described above. Similar to the input data 112, the output data 114 can include or be marked with an identifier of the machine 106, such as a serial number, a name, or other code or unique identifier of the machine 106. Individual user platforms can accordingly determine that the output data 114 is associated with the machine 106 based on the identifier indicated by the output data 114.

In some examples, the planned maintenance system 102 can provide the output data 114 to one or more the user platforms by publishing the output data 114 via an Application Programming Interface (API), or otherwise making the output data 114 available to user platforms that are configured to fetch the output data 114 associated with the machine 106 from the planned maintenance system 102. Accordingly, the planned maintenance system 102 can provide output data 114 to one or more of the user platforms in association with pull operations, for instance in response to API requests from the user platforms that request the most recent information associated with the maintenance schedule 104. As an example, a user platform may be configured to make such an API request periodically or occasionally, in response to a user operation on the user platform, in response to loading or refreshing a user interface screen displayed via the user platform, or based on any other event or schedule.

In other examples, the planned maintenance system 102 can push, or otherwise transmit, the output data 114 to one or more of the user platforms configured to receive the output data 114 associated with the machine 106. As an example, if the planned maintenance system 102 updates the maintenance schedule 104, the planned maintenance system 102 can push output data 114 that indicates the updates to the maintenance schedule 104 to one or more of the user platforms.

The planned maintenance system 102 may, in some examples, use different operations to provide output data 114 to different user platforms or different types of user platforms. As a non-limiting example, the planned maintenance system 102 can be configured to use push operations to provide output data 114 to the onboard display device 108. However, the planned maintenance system 102 may be configured to use pull operations to provide output data 114 to the user device 110 and/or other user platforms in response to API requests received from the user device 110 and/or other user platforms. Although in some examples the planned maintenance system 102 may be configured to use different operations to provide output data 114 to different user platforms or different types of user platforms as described above, in other examples the planned maintenance system 102 may be configured to use push operations to provide output data 114 to all of the user platforms, be configured to use pull operations to provide output data 114 to all of the user platforms, or provide output data 114 to the user platforms using other types of data transmission techniques or operations.

The output data 114 can cause the user platforms to display maintenance service notifications 124 and/or other data associated with maintenance services indicated by the maintenance schedule 104. For example, the maintenance service notifications 124 can indicate scheduled dates for performance of maintenance services, status information indicating whether the maintenance services are upcoming or overdue, and/or any other information about planned maintenance services indicated by the maintenance schedule 104. For example, if output data 114 associated with the maintenance schedule 104 indicates that the machine 106 is overdue for an oil change service, the onboard display device 108 can present a corresponding maintenance service notification indicating that an oil change service is overdue, and/or indicating a currently-scheduled date for performance of the oil change service, as shown in FIG. 1. The output data 114 can also cause a similar maintenance service notification, indicating that an oil change service for the machine 106 is overdue and/or indicating the currently-scheduled date for the oil change service, to be displayed on the user device 110 via an application or website associated with the planned maintenance system 102.

As another example, output data 114 associated with the maintenance schedule 104 may indicate that a particular maintenance service is to be performed at an interval of 300 operating hours from the last instance of that particular maintenance service. The onboard display device 108 may use usage data 120 to locally determine that 250 operating hours have elapsed since the last instance of that particular maintenance service was performed on the machine 106, and thus locally determine that the next instance of the particular maintenance service is still upcoming, and is to be performed on the machine 106 in 50 more operating hours. The onboard display device 108 can accordingly display a maintenance service notification indicating that the particular maintenance service is upcoming, and/or is to be performed on the machine 106 in 50 more operating hours. Although the onboard display device 108 can display such a maintenance service notification by locally determining a difference between current data and a scheduled date and/or target interval indicated by output data 114 associated with the maintenance schedule 104 that has been received from the planned maintenance system 102 in some examples, the planned maintenance system 102 may also use usage data 120 associated with the machine 106 to determine such differences and provide corresponding output data 114 to the onboard display device 108 and/or other user platforms. For instance, in the above example, the planned maintenance system 102 may also determine from usage data 120 that the next instance of the particular maintenance service has an "upcoming" status, and is to be performed on the machine 106 in 50 more operating hours, and provide output data 114 that causes the onboard display device 108 and/or other user platforms to display corresponding maintenance service notifications 124.

In some examples, a user of the user device 110 may use the application or website associated with the planned maintenance system 102 to search for a serial number or other identifier of the machine 106. The application or website can accordingly display maintenance service notifications 124 associated with the machine 106 in response to the search, based on the output data 114 and/or other data associated with the maintenance schedule 104. For example, although the onboard display device 108 is onboard the machine 106 and may be configured to display maintenance information associated specifically with the machine 106, the application or website executing via the user device 110 may be configured to display maintenance information associated with any machine, or any machine within a fleet of machines. Accordingly, a user of the user device 110 may use the application or website to search for the identifier of the machine 106, in order to load and display the maintenance information associated specifically with the machine 106. In some examples, when a user of the user device 110 uses the application or website to search for the identifier of the machine 106, the application or website may use an API associated with the planned maintenance system 102 to request output data 114 associated with the maintenance schedule 104 for the machine 106, such that the application or website can then display corresponding information indicated by the output data 114.

Maintenance service notifications 124 can be presented in user interfaces of the onboard display device 108, the user device 110, and/or other user platforms in association with user-selectable options 126. The onboard display device 108, the user device 110, and/or other user platforms can have input devices 128, such as touch-sensitive display screens, keypads, keyboards, joystick-like controllers, navigation buttons, and/or other input mechanisms that allow users to navigate the user interfaces and select user-selectable options 126. User-selectable options 126 can be selected by users to provide input data 112 to the planned maintenance system 102, for instance to mark corresponding maintenance services as complete or to provide other types of input data 112. User-selectable options 126 can also, in some examples, be used to navigate through the user interfaces, for instance to return to a previous screen, a home screen, or other section of a user interface. User-selectable options 126 can also allow a user to select a language preference, change other settings, and/or provide any other type of user input.

Selection of a user-selectable option at a user platform can cause the user platform to send corresponding input data 112 to the planned maintenance system 102. If the input data 112 impacts the maintenance schedule 104, the planned maintenance system 102 can adjust the maintenance schedule 104 based on the input data 112, as described above. The planned maintenance system 102 can also provide corresponding output data 114 to all of the user platforms, such that all of the user platforms can be provided with synchronized data about the maintenance schedule 104 in response to the input data 112 provided by one of the user platforms.

For example, if an oil change service was scheduled for the machine 106 as shown in FIG. 1, a maintenance technician may use the onboard display device 108 to select a user-selectable option indicating that the oil change service for the machine 106 has been completed. Selection of the user-selectable option can cause the onboard display device 108 to transmit corresponding input data 112, indicating the completion of the oil change service, to the planned maintenance system 102. The planned maintenance system 102 can accordingly update the maintenance schedule 104 to mark the oil change service as complete, and schedule or reschedule the next oil change service, in response to the input data 112. The planned maintenance system 102 can also provide corresponding output data 114, indicating that the current oil change service has been completed and indicating a scheduled date for the next oil change service, to all of the user platforms. For example, the planned maintenance system 102 can provide the output data 114 to the onboard display device 108, to the user device 110, and to any other user platforms configured to access information about the maintenance schedule 104 for the machine 106. Accordingly, even though in this example a maintenance technician used the onboard display device 108 to indicate that the oil change service was performed, the planned maintenance system 102 can synchronize information at the onboard display device 108, the user device 110, and other user platforms to indicate that the oil change service has been performed.

Similarly, if a user were to instead mark the oil change service as complete via the user device 110, the user device 110 can send similar input data 112 to the planned maintenance system 102 that causes the planned maintenance system 102 to update the maintenance schedule 104 and provide corresponding output data 114 to the user platforms, including the onboard display device 108. Accordingly, although the oil change service was marked as complete via the user device 110 in this example, the output data 114 from the planned maintenance system 102 can cause the onboard display device 108 and other user platforms to also indicate that the oil change service has been completed. For instance, in response to receipt of output data 114 indicating that the oil change service has been completed, the onboard display device 108 may automatically clear, or stop displaying, the maintenance service notification that had been indicating that the oil change service was still to be performed.

In some examples, input data 112 can indicate language preferences of a user. In response to input data 112 that indicates a language preference, the planned maintenance system 102 can provide output data 114 that uses the language indicated by the input data 112 to express information associated with the maintenance schedule 104. For example, a user of a user platform on the user device 110 may have changed a local setting or language preference to indicate that the user speaks Spanish. In this example, input data 112 from the user platform that requests the most recent information about the maintenance schedule 104 may include a header value, or other data, indicating the user-set Spanish language preference. The planned maintenance system 102 can accordingly return a version of the output data 114 that expresses information in Spanish. Another user of the same user platform, or a different user platform, may have set an English language preference, such that the planned maintenance system 102 can return a version of the output data 114 that expresses information in English in response to input data 112 indicating the other user's English language preference.

As another example, a user of a user platform, such as the onboard display device 108, can provide user input indicating a language preference setting. The user platform can provide the user's language preference setting to the planned maintenance system 102 in input data 112. Accordingly, the planned maintenance system 102 can return versions of output data 114 to that user platform according to the language preference setting stored at the planned maintenance system 102 in association with that user platform. As still another example, the planned maintenance system 102 can provide output data 114 that expresses information about the maintenance schedule 104 in multiple languages to one or more user platforms, such that individual user platforms can display the information using any of those multiple languages according to a locally-stored user language preference.

As discussed above, the planned maintenance system 102 can receive input data 112 from any of the user platforms, update the maintenance schedule 104 in response to the input data 112, and/or provide corresponding output data 114 to all of the user platforms. Instances of the input data 112 and the output data 114 can be data messages, files, or other data. For example, instances of the input data 112 and the output data 114 can be messages formatted according to one or more data formats such as protocol buffer ("protobuf"), JavaScript Object Notation (JSON), Extensible Markup Language (XML), or other data formats. In some examples, the planned maintenance system 102 can have an input data consumer 130 that is configured to receive and process the input data 112, and can have an output data publisher 132 that is configured to publish and/or send the output data 114.

The input data consumer 130 can include one or more elements configured to receive or listen for instances of input data 112, such as protobuf messages, from user platforms, and add the instances of input data 112 to a queue. As a non-limiting example, the input data consumer 130 can include an Amazon® Simple Queue Service (SQS) element configured to receive protobuf messages, and add the protobuf messages to a queue. The input data consumer 130 can also include one or more elements that process the instances of input data 112 from the queue, for example by identifying which machine each instance of input data is associated with, and by updating corresponding maintenance schedules in a database based on the instances of the input data 112.

The output data publisher 132 can include one or more elements configured to detect changes to the maintenance schedules in the database, and create corresponding instances of output data 114, such as protobuf messages. In some examples, the output data publisher 132 can use an API to publish the instances of output data 114, such that the output data 114 can be fetched by one or more user platforms via pull operations using API requests transmitted to the planned maintenance system 102. In some examples, the output data publisher 132 may also, or alternately, directly push or send instances of output data 114 associated with the machine 106 to one or more user platforms, such as the onboard display device 108, that are specifically associated with the machine 106.

Some user platforms can be configured to listen for and/or fetch output data 114 published by the output data publisher 132 on a relatively frequent basis, such as once per second or once per minute. Accordingly, the user platforms can receive the output data 114 relatively quickly after the output data 114 is created and published by the output data publisher 132, and/or after the user platforms submit API requests for the output data 114 to the planned maintenance system 102. Data maintained by multiple user platforms about the maintenance schedule 104 can thus be synchronized based on the most recent output data 114 associated with the maintenance schedule 104. In other examples in which the output data publisher 132 directly pushes output data 114 to one or more user platforms, the user platforms can receive the output data 114 substantially immediately after the output data publisher 132 creates and sends the output data 114. The data maintained by multiple user platforms about the maintenance schedule 104 can thus be synchronized based on the most recent output data 114 associated with the maintenance schedule 104. As discussed above, in some examples the planned maintenance system 102 can be configured to directly push output data 114 to one or more types of user platforms, such as the onboard display device 108, but provide output data 114 to other types of user platforms in response to requests received from those user platforms.

As described above, if a user of the onboard display device 108, the user device 110, or another user platform marks a particular instance of a maintenance service associated with the machine 106 as being complete, the planned maintenance system 102 can adjust the maintenance schedule 104 to mark the particular instance of the maintenance service as complete. The planned maintenance system 102 can also add or reschedule one or more future instances of the same and/or different maintenance services in the maintenance schedule 104, based on the indication that the particular instance of the maintenance service has been completed. The planned maintenance system 102 can provide corresponding output data 114 to the user platforms that indicate the completion of the particular instance of the maintenance service, and that may indicate any new or rescheduled future instances of the same and/or different maintenance services, such that the user platforms can be synchronized with consistent information about the maintenance schedule 104 for the machine 106.

However, in some situations, a user of a user platform may make an error, and cause the user platform to provide erroneous input data 112 to the planned maintenance system 102. For example, the user may mark the wrong type of maintenance service as complete, mark the wrong instance of a maintenance service as complete, or mark an instance of a maintenance service as complete in association with the wrong machine. In such situations, the planned maintenance system 102 may adjust the maintenance schedule 104 for the machine 106 based on the erroneous input data 112, and cause the user platforms to be synchronized based on the adjusted maintenance schedule 104. However, the user or a different user may correct the error by providing new input data 112 to the planned maintenance system 102 that causes the planned maintenance system 102 to undo the changes to the maintenance schedule 104 and/or re-adjust the maintenance schedule 104 based on the new input data 112. The planned maintenance system 102 can accordingly provide output data 114 that synchronizes the user platforms based on the corrected maintenance schedule 104, so that the user platforms have consistent information about the corrected maintenance schedule 104 substantially immediately after corrections are made. New input data 112 that corrects earlier erroneous input data 112 can originate from the same user platform that provided the earlier erroneous input data 112, or a different user platform. For instance, if input data 112 containing an error came from the onboard display device 108, later input data 112 to undo the error may come from the onboard display device 108, the user device 110, or a different user platform. Similarly, if input data 112 containing an error came from the user device 110, later input data 112 to undo the error may come from the onboard display device 108, the user device 110, or a different user platform.

As a non-limiting example, if a user mistakenly uses the user device 110 to mark an instance of an oil change service for the machine 106 as having been completed, the planned maintenance system 102 can adjust the maintenance schedule 104 to schedule a next instance of the oil change service on a date that is three months, or another target interval, in the future. Corresponding output data 114 can cause the onboard display device 108, the user device 110, and other user platforms to clear any maintenance service notifications 124 associated with the instance of the oil change service that was marked as complete, and to instead indicate the new date for the next scheduled instance of the oil change service. However, if the user or another user notices the mistake, the user or the other user can provide new input data 112, via the onboard display device 108, the user device 110, or another user platform, that causes the planned maintenance system 102 to revert, or otherwise undo, the changes to the maintenance schedule 104. The planned maintenance system 102, for example, can restore the mistakenly-cleared instance of the oil change service for the machine 106 to the maintenance schedule 104, and can cancel or reschedule the next instance of the oil change service scheduled for the future date from the maintenance schedule 104. The planned maintenance system 102 can provide new output data 114 reflecting the corrections to the maintenance schedule. The new output data 114 can cause the onboard display device 108, the user device 110, and other user platforms to indicate that the mistakenly-cleared instance of the oil change service is again scheduled to be performed on the machine 106. For example, although the onboard display device 108 may have cleared a maintenance service notification indicating that an oil change service was scheduled in response to the user's original mistake, the onboard display device 108 can again display a maintenance service notification indicating that an oil change service is scheduled once the mistake is corrected via the onboard display device 108 or a different user platform.

In some examples, after a user marks an instance of a maintenance service as complete via the onboard display device 108, the user device 110, or another user platform, the user can also provide additional user input to select a particular scheduling scheme or particular date that the planned maintenance system 102 is to use to schedule the next instance of the maintenance service for the machine 106, or to schedule or reschedule future instances of other maintenance services for the machine 106. The selected scheduling scheme may, for example, indicate one or more target intervals between instances of maintenance services, or adjustments to default target intervals.

As a non-limiting example, the maintenance schedule 104 may indicate that a particular maintenance service is associated with a target interval of 250 operating hours between instances of the particular maintenance service. Accordingly, an instance of a particular maintenance service may be scheduled for a date that corresponds with 250 operating hours after the previous instance of the maintenance service was performed on the machine 106. However, if the maintenance service is not actually performed on the machine 106 until 400 operating hours after the previous instance of the maintenance service was performed on the machine 106, the next instance of the maintenance service may in some cases be set by default at 500 operating hours after the previous instance of the maintenance service was performed (based on adding the target interval of 250 operating hours to the scheduled date for the current instance of the maintenance service). However, because that would only be 100 operating hours after performance of the current instance of the maintenance service, a user may have the option of using a user platform to select a different scheduling scheme that sets the next instance of the maintenance service at 200 or 250 operating hours after the most recent performance of the maintenance service. The planned maintenance system 102 can accordingly use the user-selected scheduling scheme to adjust the maintenance schedule 104 as described above, and then provide corresponding output data 114 to synchronize all of the user platforms.

In some examples, a user may mark a maintenance service as complete, and the planned maintenance system 102 can use a default scheduling scheme to adjust the maintenance schedule 104. In these examples, the planned maintenance system 102 can provide output data 114 to synchronize all of the user platforms with the changes to the maintenance schedule 104 made based on the default scheduling scheme. However, the same user or another user may later use a user platform to review the changes to the maintenance schedule 104, and provide new input data 112 that indicates a different user-selected scheduling scheme. In this situation, the planned maintenance system 102 can use the user-selected scheduling scheme to reschedule one or more maintenance services in the maintenance schedule 104, and then provide corresponding output data 114 to synchronize all of the user platforms with the new changes to the maintenance schedule 104.

A user can also provide input data 112, via a user platform, to add or change default target intervals or default scheduling schemes. For example, a manager of a fleet may use the onboard display device 108, the user device 110, or another user platform to provide input indicating that a particular type of maintenance service should be performed on machines every 400 operating hours, instead of every 300 operating hours. As another example, the manager may use the onboard display device 108, the user device 110, or another user platform to provide input indicating a new target interval for a type of maintenance service, for instance if a target interval for that type of maintenance service was not previously indicated in the maintenance schedules. In these examples, the planned maintenance system 102 can save any new and/or adjusted target intervals in the maintenance schedules for the machines in the fleet, and can also adjust the maintenance schedules to schedule and/or reschedule any corresponding instances of the maintenance service based on the new and/or adjusted target intervals. The planned maintenance system 102 can also provide output data 114 that synchronizes user platforms with the changes to the maintenance schedules.

As described above, the planned maintenance system 102 may also automatically adjust the maintenance schedule 104 for the machine 106 based on usage data 120 associated with the machine 106. For example, if the usage data 120 indicates that the machine 106 has not been in use over a period of time, the planned maintenance system 102 may automatically adjust the maintenance schedule 104 to reschedule and delay maintenance service instances by a corresponding period of time. If the planned maintenance system 102 makes such automatic adjustments to the maintenance schedule 104 based on usage data 120, instead of or in addition to input data 112, the planned maintenance system 102 can provide output data 114 that synchronizes user platforms with the adjustments to the maintenance schedule 104.

Overall, any changes to the maintenance schedule 104 for the machine 106 based on input data 112 indicating completions of maintenance services, adjustments to target intervals between instances of maintenance services, new target intervals, changes to scheduling schemes, and/or other input can be propagated to all of the user platforms, including the onboard display device 108. The planned maintenance system 102 can accordingly implement bidirectional communications and data synchronization between different user platforms, such that changes made based on input data 112 from any user platform can be propagated to the other user platforms, and all of the user platforms, including the onboard display device 108, can be synchronized with consistent information about the maintenance schedule 104. Examples of changes to the maintenance schedule 104 based on different types of input data 112 and/or usage data 120 are described below with respect to FIGS. 2-5.

Figure 2:
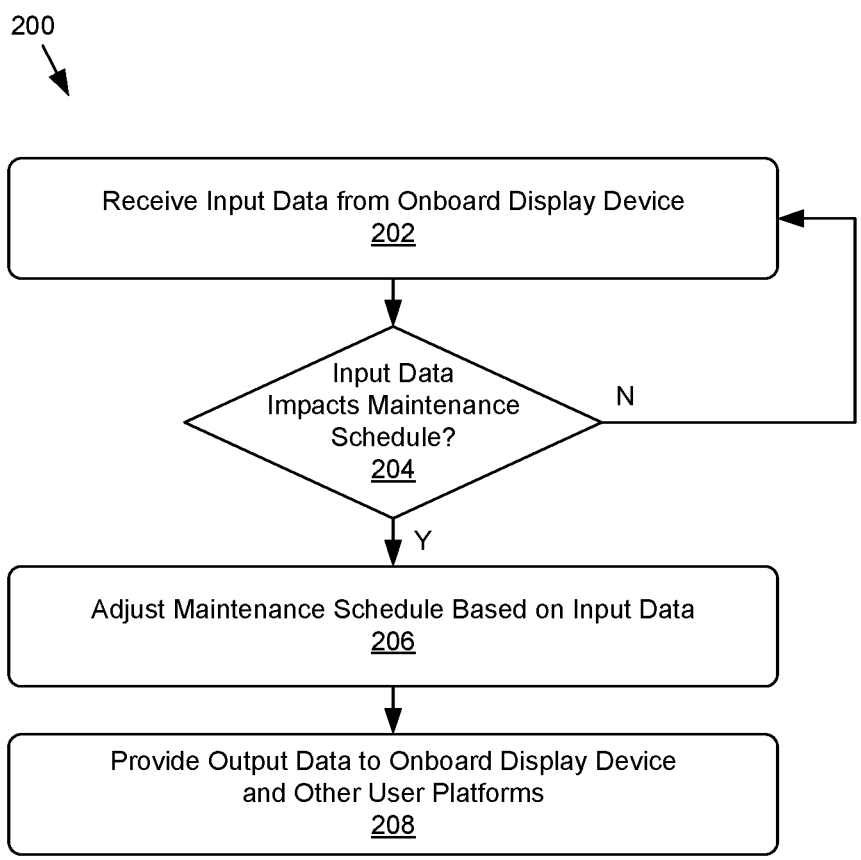
FIG. 2 shows a flowchart illustrating a first example process for adjusting the maintenance schedule for the machine, and synchronizing a set of user platforms that includes the onboard display device of the machine.

FIG. 2 shows a flowchart illustrating a first example process 200 for adjusting the maintenance schedule 104 for the machine 106, and synchronizing a set of user platforms that includes the onboard display device 108 of the machine 106. The operations shown in FIG. 2 can be performed by the planned maintenance system 102, for instance via one or more processors and/or other elements of a computing system that executes the planned maintenance system 102. FIG. 6, discussed further below, shows an example system architecture for a computing system that can execute the planned maintenance system 102 and can perform the operations shown in FIG. 2.

At block 202, the planned maintenance system 102 can receive input data 112 from the onboard display device 108. The input data 112 can, in some examples, indicate that a user of the onboard display device 108 has provided user input to mark a particular instance of a maintenance service as complete. For example, if a user interface of the onboard display device 108 had been indicating that the particular instance of the maintenance service was scheduled to be performed, the user input may confirm that the particular instance of the maintenance service has been performed. In some examples, the input data 112 may also indicate a user-selected scheduling scheme indicating how to schedule or reschedule the next instance of the maintenance service, or instances of other maintenance service, in response to the indication that the particular instance of the maintenance service has been completed. In other examples, the input data 112 received at block 202 can indicate that an instance of a maintenance service has been rescheduled, or indicate other information associated with the machine 106 and/or the maintenance schedule 104 for the machine 106.

At block 204, the planned maintenance system 102 can determine whether the input data 112 received at block 202 impacts the maintenance schedule 104 for the machine 106, for instance because the input data 112 leads to changes to the maintenance schedule 104. For example, if the input data 112 indicates that a previously-scheduled instance of a maintenance service has been completed, the rescheduler 118 or another element of the planned maintenance system 102 can determine that the input data 112 may lead to a change to the maintenance schedule 104 to clear the previously-scheduled instance of the maintenance service and/or to add or adjust a future instance of a maintenance service. If the planned maintenance system 102 determines that the input data 112 received at block 202 does not impact the maintenance schedule 104 (Block 204—No), the planned maintenance system 102 can wait for additional input data 112 at block 202.

However, if the planned maintenance system 102 determines that the input data 112 received at block 202 does impact the maintenance schedule 104 (Block 204—Yes), the planned maintenance system 102 can adjust the maintenance schedule 104 for the machine 106 at block 206 based on the input data 112 received at block 202. For example, if the input data 112 indicates that a particular instance of a maintenance service has been completed, at block 206 the planned maintenance system 102 can use corresponding default target intervals or a user-selected scheduling scheme to select a date for the next instance of the maintenance service, and add the date for the next instance of the maintenance service to the maintenance schedule 104.

At block 208, the planned maintenance system 102 can provide output data 114 to the onboard display device 108 and other user platforms. The output data 114 can reflect the adjustments to the maintenance schedule 104 made at block 206. For example, the output data 114 can indicate that the instance of the maintenance service has been completed and/or is no longer scheduled, and may indicate new or rescheduled future instances of maintenance services. Because the output data 114 is provided to the onboard display device 108 and to other user platforms at block 208, the onboard display device 108 and the other user platforms can all be synchronized with the most recent data associated with the maintenance schedule 104, and can display consistent information associated with the maintenance schedule 104. For example, maintenance service notifications 124 associated with the now-complete instance of the maintenance service can be cleared from all of the user platforms at or substantially near the same time, to avoid different user platforms displaying inconsistent information about the instance of the maintenance service.

Figure 3:
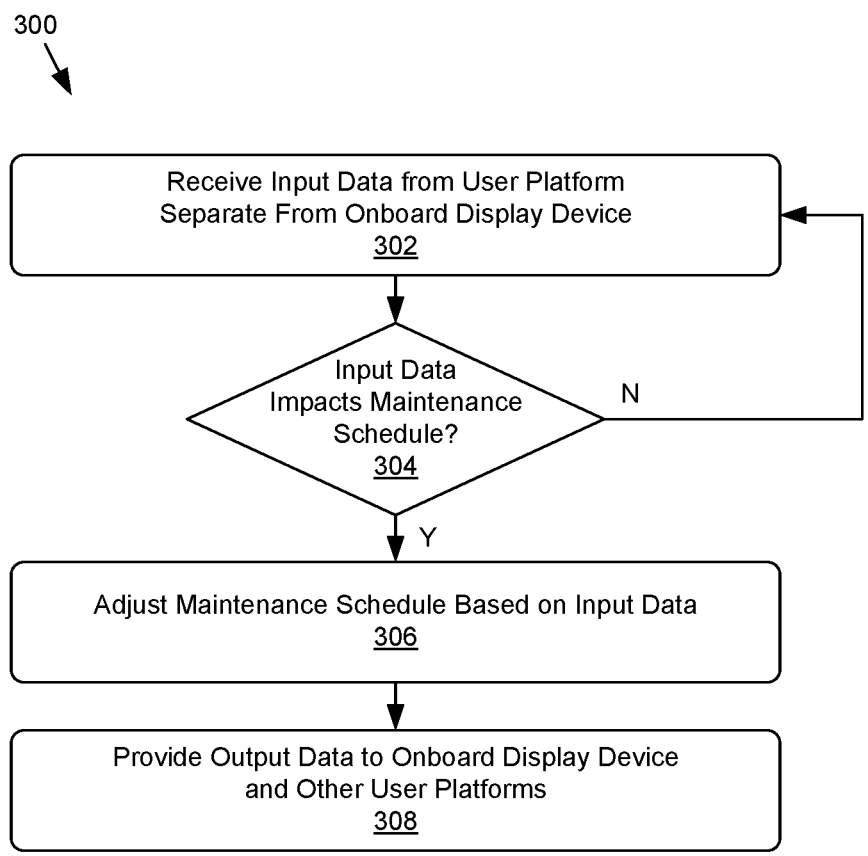
FIG. 3 shows a flowchart illustrating a second example process for adjusting the maintenance schedule for the machine, and synchronizing a set of user platforms that includes the onboard display device of the machine.

Although in the first example process 200 shown in FIG. 2 the onboard display device 108 provides input data 112 that initiates adjustments to the maintenance schedule 104 that are synchronized among the set of user platforms, in other examples different user platforms may provide similar input data 112. For example, FIG. 3 shows a flowchart illustrating a second example process 300 for adjusting the maintenance schedule 104 for the machine 106, and synchronizing a set of user platforms that includes the onboard display device 108 of the machine 106. The operations shown in FIG. 3 can be performed by the planned maintenance system 102, for instance via one or more processors and/or other elements of a computing system that executes the planned maintenance system 102. FIG. 6, discussed further below, shows an example system architecture for a computing system that can execute the planned maintenance system 102 and can perform the operations shown in FIG. 3.

At block 302, the planned maintenance system 102 can receive input data 112 from a user platform separate from the onboard display device 108. For example, the input data 112 may be received from the user device 110 or another user platform. In some examples, the input data 112 received at block 302 can indicate that a user of the separate user platform has provided user input to mark a particular instance of a maintenance service as complete. For example, a maintenance technician may have chosen to use a mobile application on the user device 110, rather than the onboard display device 108, to mark the particular instance of the maintenance service as complete. The input data 112 may also indicate a user-selected scheduling scheme indicating how to schedule or reschedule the next instance of the maintenance service, or instances of other maintenance service, in response to the indication that the particular instance of the maintenance service has been completed. In other examples, the input data 112 received at block 302 may indicate a change to default scheduling schemes or target intervals associated with one or more types of maintenance services. For example, a fleet manager may provide input data 112 at block 302, via a web application or other user platform, to adjust scheduling schemes or target intervals associated with maintenance services for one or more machines in a fleet. In still other examples, the input data 112 received at block 302 can indicate that an instance of a maintenance service has been rescheduled, or indicate other information associated with the machine 106 and/or the maintenance schedule 104 for the machine 106.

At block 304, the planned maintenance system 102 can determine whether the input data 112 received at block 302 impacts the maintenance schedule 104 for the machine 106, for instance because the input data 112 leads to changes to the maintenance schedule 104. For example, if the input data 112 indicates that a previously-scheduled instance of a maintenance service has been completed, the rescheduler 118 or another element of the planned maintenance system 102 can determine that the input data 112 may lead to a change to the maintenance schedule 104 to clear the previously-scheduled instance of the maintenance service and/or to add or adjust a future instance of a maintenance service. If the planned maintenance system 102 determines that the input data 112 received at block 302 does not impact the maintenance schedule 104 (Block 304—No), the planned maintenance system 102 can wait for additional input data 112 at block 302.

However, if the planned maintenance system 102 determines that the input data 112 received at block 302 does impact the maintenance schedule 104 (Block 304—Yes), the planned maintenance system 102 can adjust the maintenance schedule 104 for the machine 106 at block 306 based on the input data 112 received at block 302. For example, if the input data 112 indicates that a particular instance of a maintenance service has been completed, at block 306 the planned maintenance system 102 can use corresponding default target intervals or a user-selected scheduling scheme to select a date for the next instance of the maintenance service, and add the date for the next instance of the maintenance service to the maintenance schedule 104. If the input data 112 indicates a change to one or more scheduling schemes or target intervals that impacts dates for scheduled maintenance service instances, the planned maintenance system 102 can adjust the maintenance schedule 104 to reschedule those maintenance service instances.

At block 308, the planned maintenance system 102 can provide output data 114 to the onboard display device 108 and other user platforms, including the separate user platform that provided the input data 112 at block 302. The output data 114 can reflect the adjustments to the maintenance schedule 104 made at block 306. For example, the output data 114 can indicate that the instance of the maintenance service has been completed and/or is no longer scheduled, and may indicate new or rescheduled future instances of maintenance services. As another example, the output data 114 may indicate new or rescheduled maintenance service instances that were added or adjusted in the maintenance schedule 104 based on other types of input data 112. Because the output data 114 is provided to the onboard display device 108 and to other user platforms at block 308, the onboard display device 108 and the other user platforms can all be synchronized with the most recent data associated with the maintenance schedule 104, and can display consistent information associated with the maintenance schedule 104.

After the planned maintenance system 102 adjusts the maintenance schedule 104 based on input data 112 and provides corresponding output data 114 to synchronize the set of user platforms according to the first example process 200 or the second example process 300, the planned maintenance system 102 may receive new input data 112 from the same or a different source that causes additional adjustments to the maintenance schedule 104. In these examples, the planned maintenance system 102 can further adjust the maintenance schedule 104 based on the new input data 112, and provide new output data 114 to the set of user platforms to synchronize the set of user platforms with the most recent version of the maintenance schedule 104.

Figure 4:
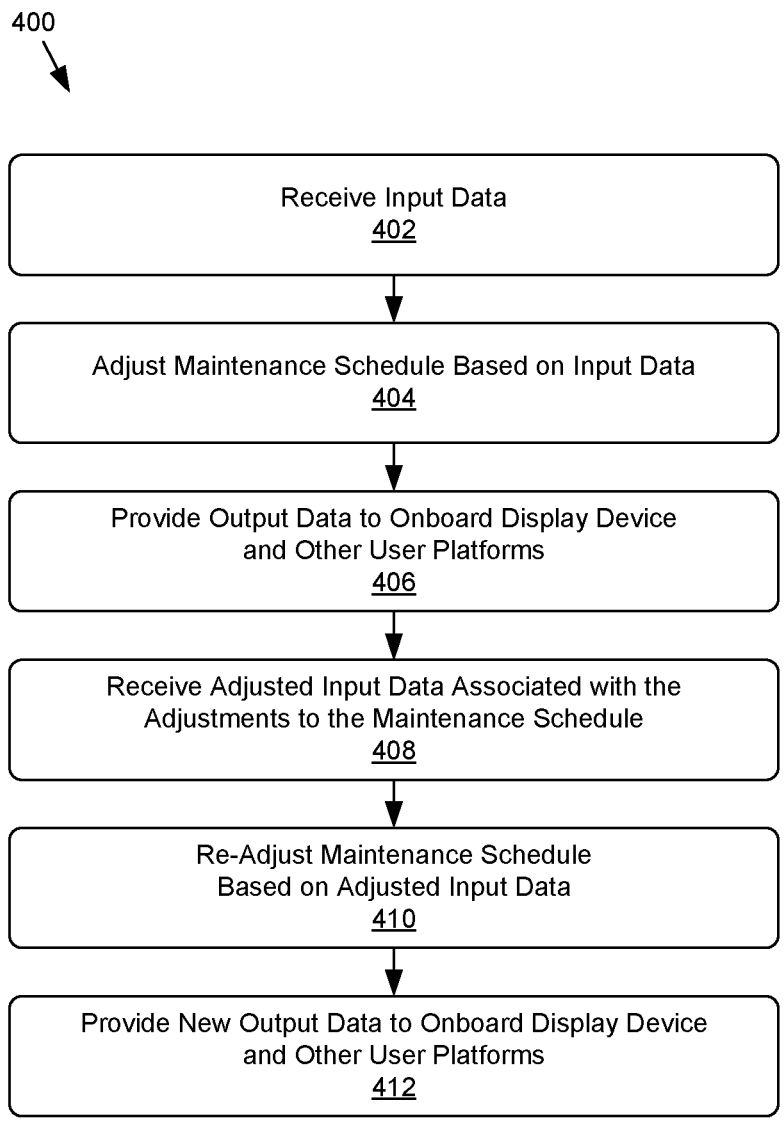
FIG. 4 shows a flowchart illustrating a third example process for adjusting the maintenance schedule for the machine based on input data, and later re-adjusting the maintenance schedule based on adjusted input data.

As an example, FIG. 4 shows a flowchart illustrating a third example process 400 for adjusting the maintenance schedule 104 for the machine 106 based on input data 112, and later re-adjusting the maintenance schedule 104 based on adjusted input data 112. The operations shown in FIG. 4 can be performed by the planned maintenance system 102, for instance via one or more processors and/or other elements of a computing system that executes the planned maintenance system 102. FIG. 6, discussed further below, shows an example system architecture for a computing system that can execute the planned maintenance system 102 and can perform the operations shown in FIG. 4.

At block 402, the planned maintenance system 102 can receive input data 112 from a user platform, such as the onboard display device 108, the user device 110, or another user platform. The input data 112 received at block 402 can, for example, indicate that a user of the user platform has provided user input to mark a particular instance of a maintenance service as complete. The input data 112 may also indicate a user-selected scheduling scheme indicating how to schedule or reschedule the next instance of the maintenance service, or instances of other maintenance service, in response to the indication that the particular instance of the maintenance service has been completed. In some examples, the input data 112 received at block 302 can indicate that an instance of a maintenance service has been rescheduled, or indicate other information associated with the machine 106 and/or the maintenance schedule 104 for the machine 106.

At block 404, the planned maintenance system 102 can adjust the maintenance schedule 104 for the machine 106 based on the input data 112 received at block 402. For example, if the input data 112 received at block 402 indicates that a particular instance of a maintenance service has been completed, the planned maintenance system 102 can use corresponding default target intervals or a user-selected scheduling scheme to select a date for the next instance of the maintenance service, and add the date for the next instance of the maintenance service to the maintenance schedule 104.

At block 406, the planned maintenance system 102 can provide output data 114 to the onboard display device 108 and other user platforms. The output data 114 can reflect the adjustments to the maintenance schedule 104 made at block 404. For example, the output data 114 can indicate that the completed instance of the maintenance service has been completed and/or is no longer scheduled, and may indicate new or rescheduled future instances of maintenance services.

At block 408, the planned maintenance system 102 can receive adjusted input data 112 associated with the adjustments to the maintenance schedule 104 made at block 404. The planned maintenance system 102 can receive the adjusted input data 112 from the same user platform that provided the input data at block 402, or from a different user platform. Accordingly, at block 410, the planned maintenance system 102 can re-adjust the maintenance schedule 104 based on the adjusted input data 112 received at block 408.

In some examples, the adjusted input data 112 received at block 408 can indicate a user instruction to undo the adjustments to the maintenance schedule 104 made at block 404. For example, if the input data 112 received at block 402 mistakenly indicated that a particular maintenance service instance had been completed, the adjusted input data 112 received at block 408 may be an "undo" instruction that revokes the previous indication that the particular maintenance service instance had been completed. Accordingly, if the maintenance service instance had been cleared from the maintenance schedule 104 and/or one or more future maintenance service instances had been scheduled or rescheduled at block 404, the adjusted input data 112 received at block 408 can cause the planned maintenance system 102 to undo those operations at block 410. As such, at block 410, the planned maintenance system 102 can revert to the prior version of the maintenance schedule 104, or reschedule one or more maintenance service instances to recreate the prior version of the maintenance schedule 104, such that the maintenance schedule 104 no longer shows the mistakenly-cleared maintenance service instance as having been completed.

In other examples, the adjusted input data 112 received at block 408 can indicate a change to a scheduling scheme that had been used to perform the adjustments at block 404, a user-specified change to a scheduled date for a particular maintenance service instance, a user-specified change to target intervals between maintenance service instance, or other changes that may impact scheduling of one or more maintenance service instances. For example, if the adjustments made to the maintenance schedule 104 at block 404 were made based on a default scheduling scheme, a user may provide adjusted input data 112 at block 408 that selects a different scheduling scheme. Accordingly, at block 410, the planned maintenance system 102 can revert the changes made at block 404 and make new changes to the maintenance schedule 104 based on the new user-selected scheduling scheme, or otherwise re-adjust the maintenance schedule 104 based on the new user-selected scheduling scheme.

At block 412, the planned maintenance system 102 can provide new output data 114, corresponding to the re-adjustments to the maintenance schedule 104 performed at block 410, to the onboard display device 108 and other user platforms. Because the output data 114 is provided to the onboard display device 108 and to other user platforms at block 412, the onboard display device 108 and the other user platforms can all be synchronized with the most recent data associated with the re-adjusted maintenance schedule 104, and can display consistent information associated with the re-adjusted maintenance schedule 104.

Figure 5:
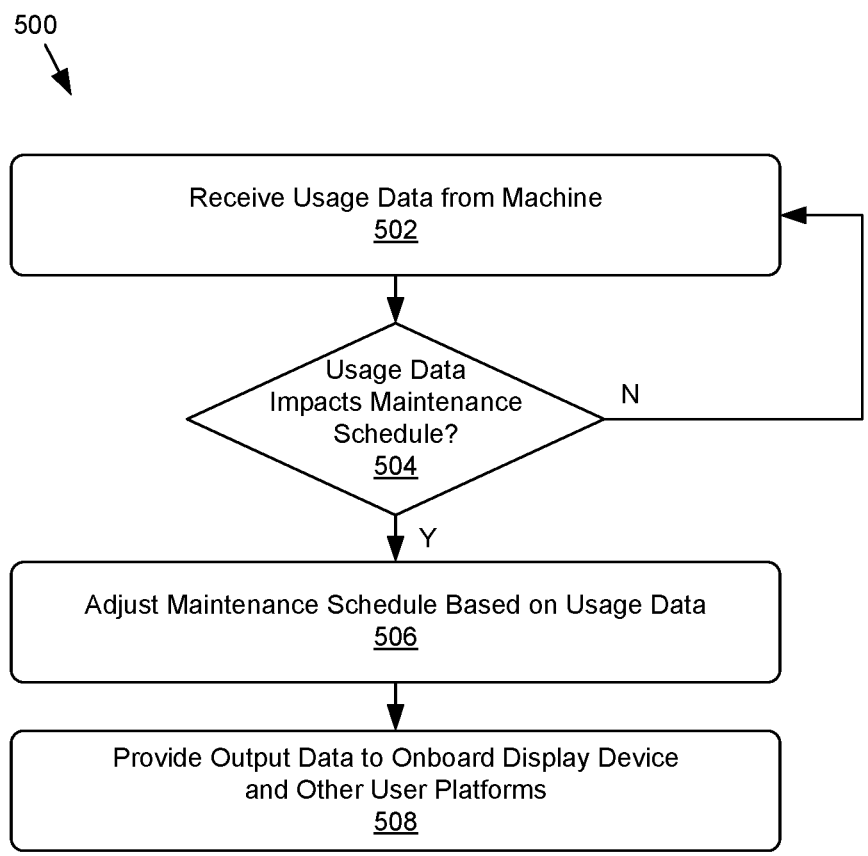
FIG. 5 shows a flowchart illustrating a fourth example process for adjusting the maintenance schedule for the machine.

As described above, in some situations the planned maintenance system 102 can also adjust the maintenance schedule 104 for the machine 106 in response to usage data 120 associated with the machine 106, instead of or in addition to adjusting the maintenance schedule 104 in response to input data 112 received from a user platform. As an example, FIG. 5 shows a flowchart illustrating a fourth example process 500 for adjusting the maintenance schedule 104 for the machine 106. The operations shown in FIG. 5 can be performed by the planned maintenance system 102, for instance via one or more processors and/or other elements of a computing system that executes the planned maintenance system 102. FIG. 6, discussed further below, shows an example system architecture for a computing system that can execute the planned maintenance system 102 and can perform the operations shown in FIG. 5.

At block 502, the planned maintenance system 102 can receive usage data 120 transmitted by the wireless communication interfaces 116 of the machine 106. In some examples, the onboard display device 108 or another computing device onboard the machine 106 can derive or determine the usage data 120 based on sensor data captured by one or more sensors 122 of the machine 106, and can transmit the usage data 120 to the planned maintenance system 102. In other examples, the onboard display device 108 or another computing device onboard the machine 106 can transmit the sensor data to the planned maintenance system 102, and the planned maintenance system 102 can derive or determine the usage data 120 based on the provided sensor data.

At block 504, the planned maintenance system 102 can determine whether the usage data 120 received at block 502 impacts the maintenance schedule 104 for the machine 106. For example, if the usage data 120 indicates that the machine 106 has been in use more often, or less often, than an average or expected usage level, the rescheduler 118 or another element of the planned maintenance system 102 may determine that instances of planned maintenance services scheduled in the maintenance schedule 104 should be rescheduled to earlier or later dates in response to the usage data 120. If the planned maintenance system 102 determines that the usage data 120 received at block 502 does not impact the maintenance schedule 104 (Block 504—No), for instance because the usage data 120 shows that the machine 106 has been used at an average or expected usage level, the planned maintenance system 102 can wait for additional usage data 120 at block 502.

However, if the planned maintenance system 102 determines that the usage data 120 received at block 502 does impact the maintenance schedule 104 (Block 204—Yes), for instance because the usage data 120 shows that the machine 106 has been used at higher or lower than an average or expected usage level, the planned maintenance system 102 can adjust the maintenance schedule 104 for the machine 106 at block 506 based on the usage data 120. For example, if a particular maintenance service instance has an "upcoming" status and is to be performed in 40 more operating hours, the maintenance schedule 104 may indicate a current scheduled date for performance of particular maintenance service instance that is five days in the future, based on historical patterns indicating that the machine 106 is normally used for eight hours a day and may accumulate 40 more operating hours in the next five days. However, if new usage data 120 for a day indicates that the machine 106 was parked throughout that day and was not used, the planned maintenance system 102 can adjust the maintenance schedule 104 at block 506 to reschedule and delay the date for performance of the particular maintenance service instance by a day. Similarly, if the usage data 120 indicates that the machine 106 was used more than an average amount during a particular time period, the planned maintenance system 102 may adjust the maintenance schedule 104 at block 506 to reschedule and move up the date for performance of a maintenance service instance in response to the usage data 120.

At block 508, the planned maintenance system 102 can provide output data 114 to the onboard display device 108 and other user platforms. The output data 114 can reflect the adjustments to the maintenance schedule 104 made at block 508 in response to the usage data 120. For example, the output data 114 can indicate new scheduled dates for any maintenance service instances that were rescheduled or adjusted by the planned maintenance system 102 in response to usage data 120 associated with the machine 106. Because the output data 114 is provided to the onboard display device 108 and to other user platforms at block 508, the onboard display device 108 and the other user platforms can all be synchronized with the most recent data associated with the maintenance schedule 104 updated in response to the usage data 120, and can display consistent information associated with the updated maintenance schedule 104.

FIG. 6 shows an example system architecture 600 for a computing system 602. The computing system 602 can include one or more computing devices, servers, or other computing elements that include one or more processors 604, memory 606, and communication interfaces 608.

In some examples, the computing system 602 can be a server, computer, or other type of computing device that executes one or more portions of the planned maintenance system 102. Elements of the planned maintenance system 102 can, in some examples, be distributed among, and/or be executed by, multiple computing systems similar to the computing system shown in FIG. 6. For example, the input data consumer 130 and/or the output data publisher 132 may execute on a different computing system than the rescheduler 118. Although in some examples the computing system 602 shown in FIG. 6 can execute one or more portions of the planned maintenance system 102, in other examples the computing system 602 shown in FIG. 6 can execute one or more elements of a user platform. For example, the onboard display device 108 and/or the user device 110 can be computing systems that have system architectures similar to the system architecture 600 shown in FIG. 5.

The processor(s) 604 can operate to perform a variety of functions as set forth herein. The processor(s) 604 can include one or more chips, microprocessors, application specific integrated circuits (ASICs), field programmable gate arrays (FPGAs) and/or other programmable circuits, central processing units (CPUs), graphics processing units (GPUs), digital signal processors (DSPs), and/or other processing units or components known in the art. In some examples, the processor(s) 604 can have one or more arithmetic logic units (ALUs) that perform arithmetic and logical operations, and/or one or more control units (CUs) that extract instructions and stored content from processor cache memory, and executes such instructions by calling on the ALUs during program execution. The processor(s) 604 can also access content and computer-executable instructions stored in the memory 606, and execute such computer-executable instructions.

The memory 606 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media can be non-transitory computer-readable media. The computer-readable media can be configured to store computer-executable instructions that can be executed by the processor(s) 604 to perform operations described herein.

For example, the memory 606 can include a drive unit and/or other elements that include machine-readable media. A machine-readable medium can store one or more sets of instructions, such as software or firmware, that embodies any one or more of the methodologies or functions described herein. The instructions can also reside, completely or at least partially, within the processor(s) 604 and/or communication interface(s) 608 during execution thereof by the computing system 602. For example, the processor(s) 604 can possess local memory, which also can store program modules, program data, and/or one or more operating systems.

The memory 606 can store modules and data 610, such as data and/or computer-executable instructions associated with maintaining and/or synchronizing the maintenance schedule 104 for the machine 106. For example, if the computing system 602 is associated with the planned maintenance system 102, the modules and data 610 can include data and/or computer-executable instructions associated with the maintenance schedule 104, the rescheduler 118, the input data consumer 130, and/or the output data publisher 132. As another example, if the computing system 602 is associated with one of the user platforms, such as the onboard display device 108 or the user device 110, the modules and data 610 can include data and/or computer-executable instructions associated display of a user interface, transmission of input data 112 to the planned maintenance system 102, and receipt of output data 114 from the planned maintenance system 102. The modules and data 610 can also include other data and/or computer-executable instructions that can be utilized by the computing system 602 to perform or enable performing any action taken by the computing system 602. For example, the modules and data 610 can include a platform, operating system, and/or applications, as well as data utilized by the platform, operating system, and/or applications.

The communication interfaces 608 can include transceivers, modems, interfaces, antennas, and/or other components that can transmit and/or receive data over networks or other data connections. In some examples, the communication interfaces 608 can be, or include, the wireless communication interfaces 116 that the computing system 602 can use to send and/or receive data, such as the input data 112, the output data 114, and/or the usage data 120.

INDUSTRIAL APPLICABILITY

As described above, the planned maintenance system 102 can change the maintenance schedule 104 for the machine 106 based on input data 112 received from any user platform and/or based on usage data 120 associated with the machine 106. The planned maintenance system 102 can also be bidirectional, such that the changes to the maintenance schedule 104 made based on input data 112 from one user platform can be propagated to all of the user platforms, including the onboard display device 108 of the machine 106. Accordingly, all of the user platforms, including the onboard display device 108 of the machine 106, can be synchronized with consistent information about the maintenance schedule 104 for the machine 106.

Synchronization of the maintenance schedule 104 between the onboard display device 108 and other user platforms via the planned maintenance system 102 can provide benefits over other systems that do not synchronize onboard displays with other systems. For example, because the planned maintenance system 102 synchronizes the maintenance schedule 104 for the machine 106 between all of the user platforms, including the onboard display device 108 of the machine 106, users of any of the user platforms can access consistent information about the maintenance schedule 104 and avoid being confused by inconsistent information.

As another example, synchronizing the maintenance schedule 104 between the onboard display device 108 and other user platforms via the planned maintenance system 102 can improve efficiencies and productivity for the machine 106, a worksite at which the machine 106 operates, maintenance technicians and facilities, and other entities, relative to systems that do not synchronize schedules of planned maintenance services between machine onboard display devices and other user platforms. For instance, duplication of operations by users and/or user platforms can be avoided due to the synchronization of the maintenance schedule 104 between the onboard display device 108 and other user platforms. Accordingly, if a maintenance service notification is cleared on one user platform, the planned maintenance system 102 can cause the maintenance service notification to be automatically cleared on the other user platforms, for instance when output data 114 is pushed to the user platforms or the user platforms next request output data 114 from the planned maintenance system 102. As such, users may not have to manually clear different instances of maintenance service notifications 124 on multiple user platforms. For example, a user can avoid using the onboard display device 108 to clear a maintenance service notification, and also using the user device 110 to clear a different instance of the same maintenance service notification.

Moreover, because changes implemented on one user platform can be synchronized and propagated to the other user platforms via the planned maintenance system 102, and users can avoid duplicating operations on multiple user platforms, overall usage of a set of user platforms by users can be reduced in the aggregate. Accordingly, overall usage of energy and processor cycles, memory, and/or other computing resources associated with the set of user platforms can be reduced due to the synchronization between the onboard display device 108 and the other user platforms provided by the planned maintenance system 102. For example, if a user uses a user platform such as a website to clear a maintenance service notification for a machine, the planned maintenance system 102 can cause a corresponding maintenance service notification to be automatically cleared from the onboard display device 108 of the machine 106. Accordingly, a user can avoid using the onboard display device 108 to manually clear the corresponding maintenance service notification. By avoiding use of the onboard display device 108 by a user in this example, the onboard display device 108 may use less energy, and may use fewer processor cycles or other computing resources.

While aspects of the present disclosure have been particularly shown and described with reference to the embodiments above, it will be understood by those skilled in the art that various additional embodiments may be contemplated by the modification of the disclosed machines, systems, and method without departing from the spirit and scope of what is disclosed. Such embodiments should be understood to fall within the scope of the present disclosure as determined based upon the claims and any equivalents thereof.

What is claimed is:

1. A computing system, comprising:
one or more processors;
one or more communication interfaces; and
memory storing computer-executable instructions associated with a planned maintenance system that, when executed by the one or more processors, cause the one or more processors to perform operations comprising:
maintaining a planned maintenance schedule associated with a machine that is separate from the computing system, wherein:
the planned maintenance schedule identifies instances of one or more maintenance services that are due to be performed on the machine based at least in part on corresponding intervals;
making one or more changes to the planned maintenance schedule based on input data, associated with the planned maintenance schedule, received via the one or more communication interfaces from:
an onboard display device of the machine, or
a user platform that is separate from the onboard display device and the computing system; and
synchronizing, based on the one or more changes, and by providing output data via the one or more communication interfaces to the onboard display device of the machine and to the user platform, information associated with the planned maintenance schedule, wherein:
the information associated with the planned maintenance schedule is accessible by one or more users via the onboard display device of the machine and the user platform.

2. The computing system of claim 1, wherein the user platform is a website or a local application configured to execute on a user device separate from the onboard display device.

3. The computing system of claim 1, wherein:
the input data is received from the onboard display device via the one or more communication interfaces, and
the output data causes the user platform to update the information associated with the planned maintenance schedule, accessible by the one or more users via the user platform, to reflect the one or more changes made based on the input data received from the onboard display device.

4. The computing system of claim 1, wherein:
the input data is received from the user platform via the one or more communication interfaces, and
the output data causes the onboard display device to update the information associated with the planned maintenance schedule, accessible by the one or more users via the user platform, to reflect the one or more changes made based on the input data received from the user platform.

5. The computing system of claim 1, wherein:
the input data indicates that an instance of a maintenance service, previously indicated on the planned maintenance schedule as being due to be performed, has been completed on the machine, and the output data causes maintenance service notifications, associated with the instance of the maintenance service, to be cleared in:
a first user interface of the onboard display device, and
a second user interface of the user platform.

6. The computing system of claim 1, wherein the one or more changes include at least one of:
marking a first instance of a maintenance service as complete in the planned maintenance schedule,
scheduling or rescheduling a second instance of the maintenance service based on a target interval between the first instance and the second instance, or
rescheduling the first instance or the second instance based on the input data.

7. The computing system of claim 1, wherein the one or more changes are first changes, and the operations further comprise:
receiving, via the one or more communication interfaces, adjusted input data from the onboard display device or the user platform in response to the first changes;
making one or more second changes to the planned maintenance schedule based on the adjusted input data; and
providing new output data, indicating the one or more second changes, to the onboard display device and the user platform via the one or more communication interfaces.

8. The computing system of claim 7, wherein the adjusted input data is an instruction to revert the first changes.

9. The computing system of claim 7, wherein:
the first changes include rescheduling an instance of a maintenance service based on a target interval between instances of the maintenance service,
the adjusted input data indicates a different target interval, and
the one or more second changes include rescheduling the instance of the maintenance service based on the different target interval.

10. The computing system of claim 1, wherein:
the input data is received from the onboard display device via the one or more communication interfaces, and
the input data is determined by the onboard display device based at least in part on usage data associated with the machine derived based on sensor data provided by one or more sensors of the machine.

11. The computing system of claim 1, wherein the operations further comprise:
receiving, via the one or more communication interfaces, usage data associated with the machine that is derived from sensor data provided by one or more sensors of the machine;
making one or more second changes to the planned maintenance schedule based on the usage data; and
providing second output data, indicating the one or more second changes, to the onboard display device and the user platform via the one or more communication interfaces.

12. A computer-implemented method, comprising:
maintaining, by a computing system comprising one or more processors, a planned maintenance schedule, associated with a machine separate from the computing system, wherein:
the planned maintenance schedule identifies instances of one or more maintenance services that are due to be performed on the machine based at least in part on corresponding intervals;
receiving, by the computing system, input data associated with the planned maintenance schedule via one of:
an onboard display device of the machine, or
a user platform;
making, by the computing system, one or more changes to the planned maintenance schedule based on the input data; and
providing, by the computing system, output data to the onboard display device of the machine and to the user platform,
wherein the output data:
indicates the one or more changes to the planned maintenance schedule, and
causes the onboard display device and the user platform to synchronize information, associated with the planned maintenance schedule, that is accessible to one or more users via the onboard display device and the user platform.

13. The computer-implemented method of claim 12, wherein the user platform is a website or a local application configured to execute on a user device separate from the onboard display device.

14. The computer-implemented method of claim 12, wherein:
the input data indicates that an instance of a maintenance service, previously indicated on the planned maintenance schedule as being due to be performed, has been completed on the machine, and
the output data causes maintenance service notifications, associated with the instance of the maintenance service, to be cleared in:
a first user interface of the onboard display device, and
a second user interface of the user platform.

15. The computer-implemented method of claim 12, wherein the one or more changes include at least one of:
marking a first instance of a maintenance service as complete in the planned maintenance schedule,
scheduling or rescheduling a second instance of the maintenance service based on a target interval between the first instance and the second instance, or
rescheduling the first instance or the second instance based on the input data.

16. The computer-implemented method of claim 12, wherein the one or more changes are first changes, and the computer-implemented method further comprises:
receiving, by the computing system, adjusted input data from the onboard display device or the user platform in response to the first changes;
re-adjusting, by the computing system, the planned maintenance schedule by making one or more second changes to the planned maintenance schedule based on the adjusted input data; and
providing, by the computing system, new output data indicating the one or more second changes to the onboard display device and the user platform.

17. A system, comprising:
an onboard display device of a machine;
a user platform accessible via a user device; and
a planned maintenance system configured to:
maintain a planned maintenance schedule associated with the machine;

receive input data associated with the planned maintenance schedule from one of the onboard display device or the user platform;
make one or more changes to the planned maintenance schedule based on the input data; and
provide output data to the onboard display device and to the user platform, wherein the output data:
indicates the one or more changes to the planned maintenance schedule, and
causes the onboard display device and the user platform to synchronize information, associated with the planned maintenance schedule, that is accessible to one or more users via the onboard display device and the user platform.

18. The system of claim 17, wherein the onboard display device and the user platform have respective user interfaces configured to display the information, associated with the planned maintenance schedule, based on the output data provided by the planned maintenance system.

19. The system of claim 17, wherein the user platform is a website or a local application configured to execute on the user device.

20. The system of claim 17, wherein the one or more changes include at least one of:
marking a first instance of a maintenance service as complete in the planned maintenance schedule,
scheduling or rescheduling a second instance of the maintenance service based on a target interval between the first instance and the second instance, or
rescheduling the first instance or the second instance based on the input data.

* * * * *